Aug. 1, 1939. A. E. BEALS Re. 21,166

METHOD AND APPARATUS FOR AUTOMATICALLY CONTROLLING THE OPERATION OF AIR CONDITIONING SYSTEMS

Original Filed Sept. 14, 1931 6 Sheets-Sheet 1

INVENTOR
A. E. Beals
BY
Denison & Thompson
ATTORNEYS

WITNESS
J. T. Mains.

Aug. 1, 1939. A. E. BEALS Re. 21,166

METHOD AND APPARATUS FOR AUTOMATICALLY CONTROLLING THE OPERATION OF AIR CONDITIONING SYSTEMS

Original Filed Sept. 14, 1931 6 Sheets-Sheet 2

INVENTOR
A. E. Beals
BY
Denison & Thompson
ATTORNEYS

WITNESS
J. T. Mains.

Aug. 1, 1939. A. E. BEALS Re. 21,166

METHOD AND APPARATUS FOR AUTOMATICALLY CONTROLLING THE OPERATION OF AIR CONDITIONING SYSTEMS

Original Filed Sept. 14, 1931 6 Sheets-Sheet 3

WITNESS

J. J. Mains

INVENTOR

A. E. Beals

BY

Denison & Thompson

ATTORNEYS

Aug. 1, 1939. A. E. BEALS Re. 21,166

METHOD AND APPARATUS FOR AUTOMATICALLY CONTROLLING THE OPERATION OF AIR CONDITIONING SYSTEMS

Original Filed Sept. 14, 1931 6 Sheets-Sheet 4

INVENTOR
A. E. Beals
BY
Denison & Thompson
ATTORNEYS

WITNESS
J. J. Mains.

Aug. 1, 1939. A. E. BEALS Re. 21,166

METHOD AND APPARATUS FOR AUTOMATICALLY CONTROLLING THE OPERATION OF AIR CONDITIONING SYSTEMS

Original Filed Sept. 14, 1931 6 Sheets-Sheet 5

INVENTOR

BY A. E. Beals

Denison & Thompson

ATTORNEYS

WITNESS

J. T. Mains

Aug. 1, 1939. A. E BEALS Re. 21,166.

METHOD AND APPARATUS FOR AUTOMATICALLY CONTROLLING THE OPERATION OF AIR CONDITIONING SYSTEMS

Original Filed Sept. 14, 1931 6 Sheets-Sheet 6

WITNESS
J. T. Mains

INVENTOR
A. E. Beals
BY
Denison & Thompson
ATTORNEYS

Reissued Aug. 1, 1939

Re. 21,166

UNITED STATES PATENT OFFICE 21,166

METHOD AND APPARATUS FOR AUTOMATICALLY CONTROLLING THE OPERATION OF AIR CONDITIONING SYSTEMS

Albert E. Beals, Norwich, N. Y.

Original No. 1,986,316, dated January 1, 1935, Serial No. 562,817, September 14, 1931. Application for reissue December 24, 1936, Serial No. 117,676

34 Claims. (Cl. 236—44)

This invention relates to a new and improved method and apparatus for automatically controlling the operation of air conditioning systems and in which is utilized a new and novel thermostatic unit having a comparatively wide range of activity and a plurality of combinations of such thermostatic units for automatically controlling one or more of the component members involved in the regulation of an air conditioning apparatus.

For obtaining the maximum degree of comfort of people assembled in large rooms, auditoriums, schools, or the like, it has been found necessary, especially during the summer months, to not only maintain the temperature of the air of such inclosures within certain limits depending upon the atmospheric conditions of the outside air, but that the relative humidity of the inside air be controlled in relation to the temperature of the outside air, and also in relation to the percentage of moisture contained in the outside air.

Likewise, it has been found very difficult, if not impossible, to manually control the various units of an air conditioning system for inclosures to properly maintain the desired effective temperatures of the inside air due to the practically continuous changes which occur in the temperature and relative humidity of the outside air, and also to the variations in temperature and relative humidity of the inside air due to the extremely variable load brought about by the constantly varying number of persons in the inclosure.

An object of this invention is to provide a thermostatic unit responsive to temperature changes through a comparatively wide range (as, for instance, from sixty degrees to one hundred degrees Fahrenheit), and where the registering member of the unit moves through equal increments of space in response to equal increments of temperature variation.

A second object is to provide a thermostatic unit whereby the registering member shall assume a certain definite location for a certain definite temperature.

A third object is to provide a thermostatic unit which will have a maximum degree of flexibility and an abundant extended range of movement of the actuating member. In accomplishing this result, I utilize the evaporative pressure of a volatile fluid as the operating agent while the actuating member of the thermal couple is constructed to expand and contract through the agency of varying increments of pressure due to uniform increments of temperature to which the thermosensitive member of the couple is subjected.

A further object of this invention is to provide an apparatus for controlling the operation of an air conditioning system which will be affected by the varying conditions of both the inside and the outside air for automatically maintaining the condition of the air in the inclosure at a predetermined relation to the variable condition of the outside air so as to produce the maximum degree of comfort for the people in the inclosure.

Another object is to obtain the maximum degree of economy in the operation of an air conditioning system by reducing to a minimum the unnecessary loss of refrigeration by automatically regulating and varying the effective temperature of the inside air in accord with the effective temperature of the outside air, and at the same time, holding the relative humidity within desired limits.

By effective temperature is meant that empirical scale of temperature sensation experimentally determined and plotted which indicates the relations between the actual dry bulb and wet bulb temperatures producing the same sensation of temperature to the human body.

An effective temperature chart compiled from tests conducted at the American Association of Heating and Ventilating Engineers, research laboratory, is well-known in the art and needs no further amplification here.

Still another object is to provide a control apparatus for air conditioning systems which is applicable to be utilized with various conventional systems now in use.

A further object is to provide a control apparatus which is simple, economical and durable in construction, positive and accurate in operation, and which will require the minimum amount of attention.

Other objects and advantages pertaining to the details of the structure and the form and relation of the parts thereof, will more fully appear in the following description, taken in connection with the accompanying drawings in which:

Figure 3 is an enlarged detail plan view of adjacent ends of electrical contact blocks with one of the blocks shown in section.

Figure 11:
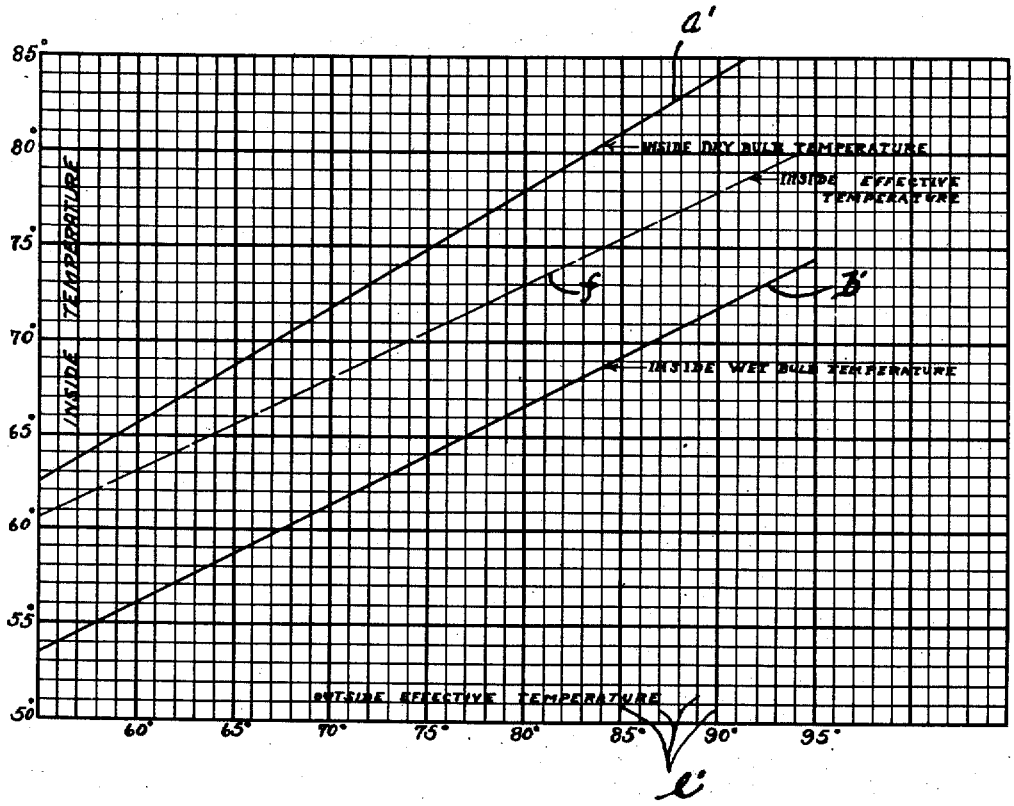

Figure 11 is a chart by which, when the outside effective temperature is given, the required inside atmospheric condition may readily be determined for producing the maximum degree of comfort, and is based upon maintaining the relative humidities at 55% throughout the range. The dry bulb and wet bulb temperatures for any particular outside effective temperature, also bear such a relation to each other that the inside effective temperature will be midway between the outside effective temperature and an effective temperature of sixty-six degrees.

Figure 7:
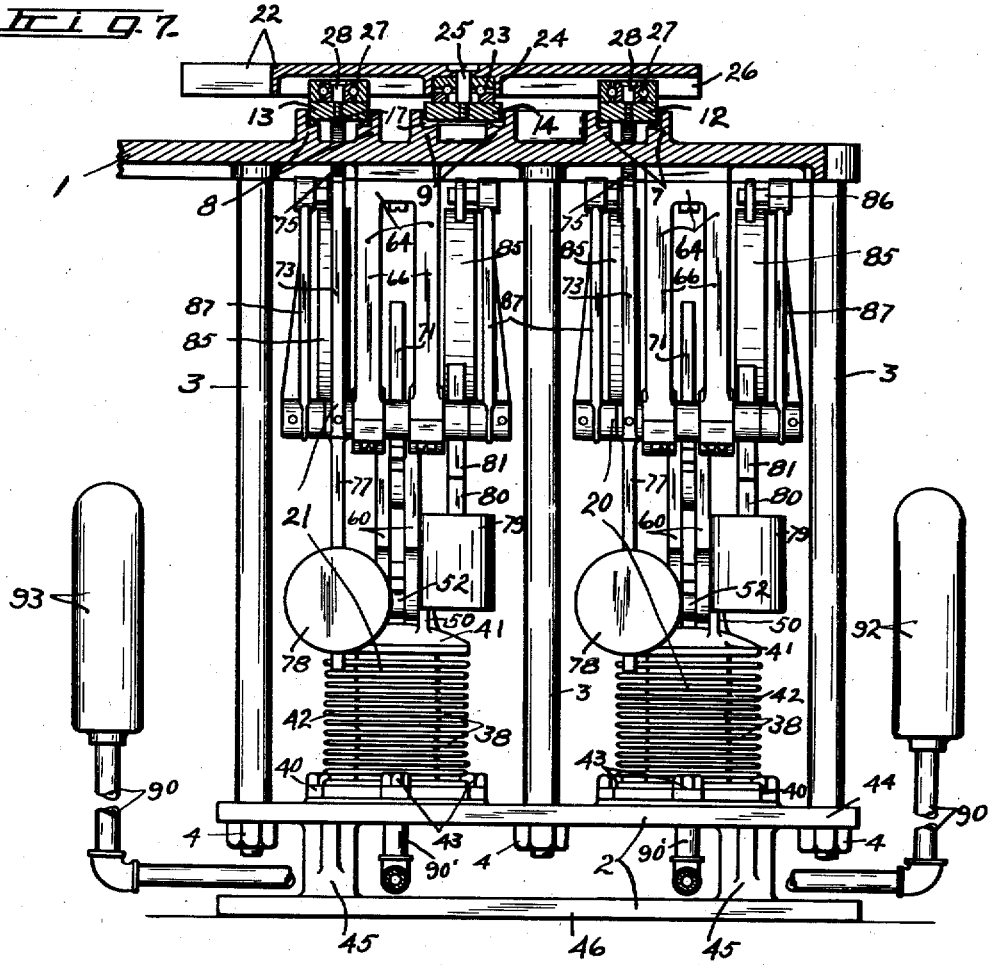
Figure 7 is an enlarged transverse vertical sectional view taken on line 7—7, Figure 1.

The apparatus, as illustrated in the drawings, consists of a substantially flat supporting frame or table 1 mounted over a pair of platforms 2 arranged beneath respective end portions of the table 1, and to which the table 1 is secured in vertical spaced relation by means of tie rods 3. There are six of these tie rods 3 for each platform 2, and they have their upper ends screw-threaded in the lower portion of the table 1, and have their lower ends reduced in diameter and clamped to respective platforms 2 by means of nuts 4, as shown more particularly in Figures 4 and 7.

The table 1 has provided in the upper surface thereof, a plurality of, in this instance five, longitudinally extending guide ways 5, 6, 7, 8 and 9 upon which are mounted for longitudinal reciprocative movement, slide members 10, 11, 12, 13 and 14. Four of these slide members, 10, 11, 12, and 13 are arranged in two pairs mounted in longitudinal spaced relation upon the respective guide ways 5, 6, 7 and 8, and each pair of slides is adapted to operate in a direction at an angle to the other while the slides of each pair are mounted to operate in parallel spaced relation and independently of each other.

Figure 1:
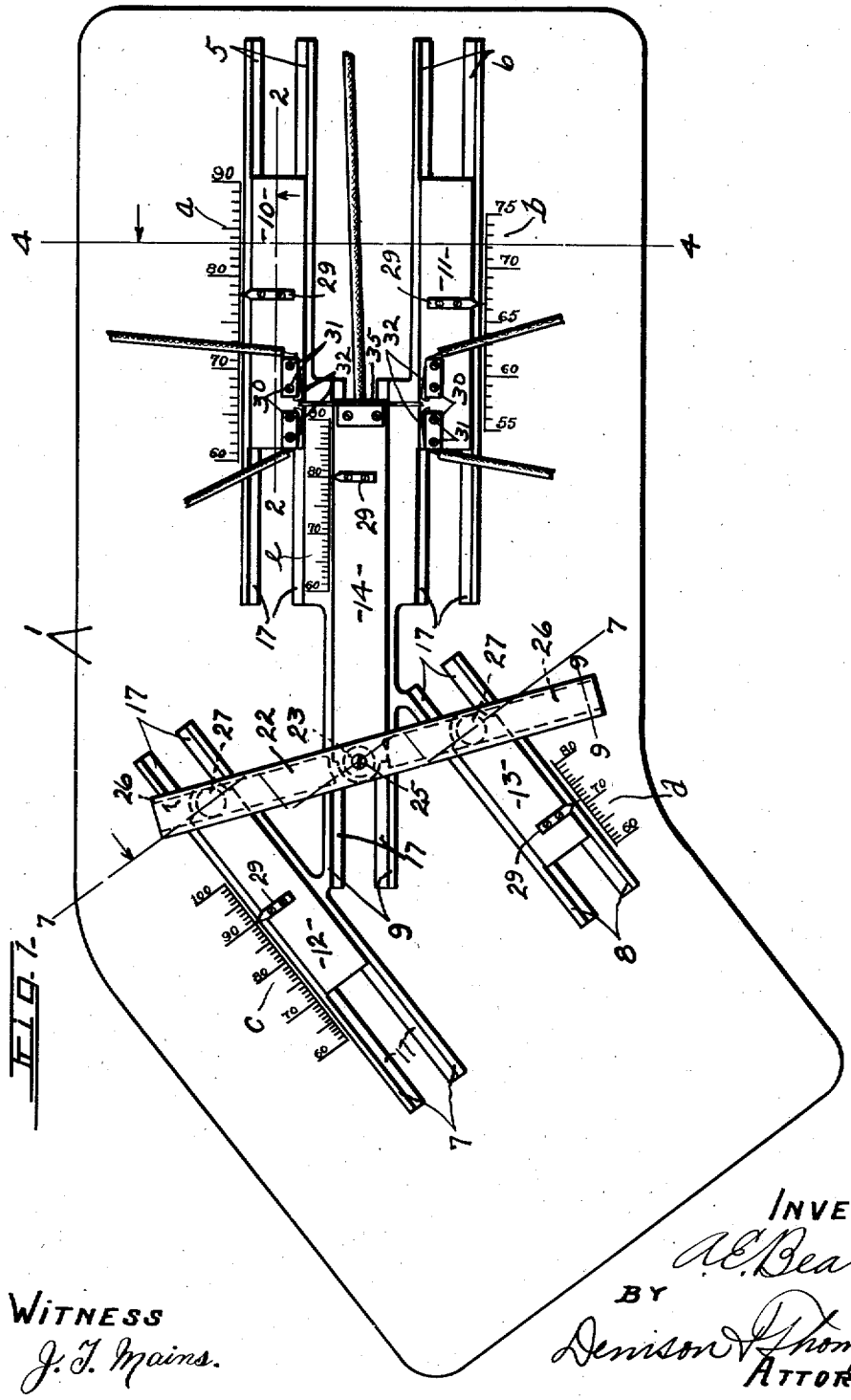
Figure 1 is a top plan of a temperature and humidity actuated control instrument embodying the various features of this invention.

The remaining slide 14 is, as shown in Figure 1, mounted substantially midway between the slides 10 and 11, and is adapted for longitudinal reciprocative movement in parallelism with the movement of said slides.

It is very essential in a device of this character that each moving part be operated with a minimum amount of friction, and for this purpose, each of the slides 10, 11, 12, 13 and 14 is mounted upon balls 15 composed of steel or other suitable material and positioned between the slides and the respective guide ways in corresponding aligned grooves 16 and 17 formed in opposite adjacent sides respectively of the slides and guides. (See Fig. 4).

Each of the slides 10, 11, 12 and 13 is actuated by a respective dry or wet bulb thermostatic unit 18, 19, 20 and 21 in a manner hereinafter more fully described, while the slide 14 is connected with and actuated by the slides 12 and 13 through the medium of a bar 22 arranged to extend transversely over the table 1 and which is pivotally connected intermediate its ends to the slide 14 by means of a ball bearing member 23 arranged in a suitable socket or recess 24 provided in the under side of the bar 22, said bearing member being pivotally maintained in its operative position by means of a pivotal shouldered screw 25 which extends downwardly through registering openings in the bar 22, and bearing member 23, and is screw-threaded in the forward end of the slide 14.

Figure 9:
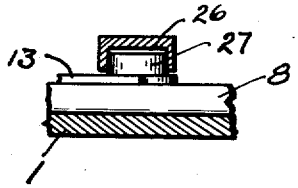
Figure 9 is a detail transverse section taken on line 9—9, Figure 1.

The bar 22 is provided with a longitudinal channel or groove 26 in the lower surface of the ends thereof and is slidably connected with the slides 12 and 13 at respective sides of the pivot 23 by means of ball bearing members 27 positioned in the channel 26 at respective ends of the bar 22, and which are secured by shouldered screws 28 to the corresponding slide members 12 or 13 at the inner ends thereof. (See Figures 1, 7 and 9).

The bearing members 27 each have a free sliding fit in the channel 26 so as to freely permit any longitudinal movement of the bearing members along the bar 22 which may be necessary during the longitudinal movements of the respective slides 12 and 13, and to also freely permit any longitudinal movement of the bar 22 relative to the slides 12 and 13 during the longitudinal movements of the slide member 14, as will be hereinafter more apparent.

The slides 10, 11, 12, 13 and 14 may, as shown in Figure 1, be each provided with a suitable scale as *a*, *b*, *c*, *d*, and *e* respectively. These scales may be provided at one side of the slides upon the surface of the table 1, the graduations of each of these scales being spaced according to the office of the respective slide member, and each slide member may be provided with an index 29 which is secured to or made integral therewith for assisting in determining the accuracy of the instrument, as will hereinafter be more apparent.

The slide members 10 and 11 are each provided with a pair of contact blocks 30 formed of any suitable insulating material and which are secured by screws 31 or other suitable means, to the slides adjacent the inner sides thereof in longitudinal spaced relation.

Each of the blocks 30 is provided with a yielding contact member 32 which, in this instance, is composed of a flat spring positioned longitudinally of the inner vertical face of the block, and is secured to said blocks at its outer ends by means of screws 33.

The inner adjacent end portions of the contact members 32 of each pair of blocks 30 terminate in slightly spaced relation and are curved, as illustrated in Figure 3, to extend a short distance beyond the inner vertical face of the blocks and register with respective grooves 34 formed in the blocks which permit the contact members to flex towards said block when engaged by a cooperating relatively rigid contact member 35.

This contact member 35 is secured in insulated relation to the intermediate slide 14 at the opposite end to that at which the tie bar 22 is pivoted. This contact member 35 is composed of brass or other suitable conducting material and is arranged to extend transversely of the slide 14 between the slides 10 and 11, and has the outer ends thereof terminating in the vicinity of the contact members 32 and normally positioned intermediate the adjacent ends of said contact members, but out of the electrical connection therewith.

The contact members 35 and 32 are so arranged that one or the other of the movable contact members 32 will be engaged by the contact member 35 upon a very slight longitudinal movement of the slide 14, or of one or the other or both of the slides 10 and 11 for making electrical connection therebetween.

Each of the slide members 10, 11, 12 and 13 may be moved longitudinally in one direction or the other along their respective guide ways 5, 6, 7 or 8 and independently of each other by their respective thermostatic control units 18, 19, 20 or 21 in the following novel manner.

Figure 2:
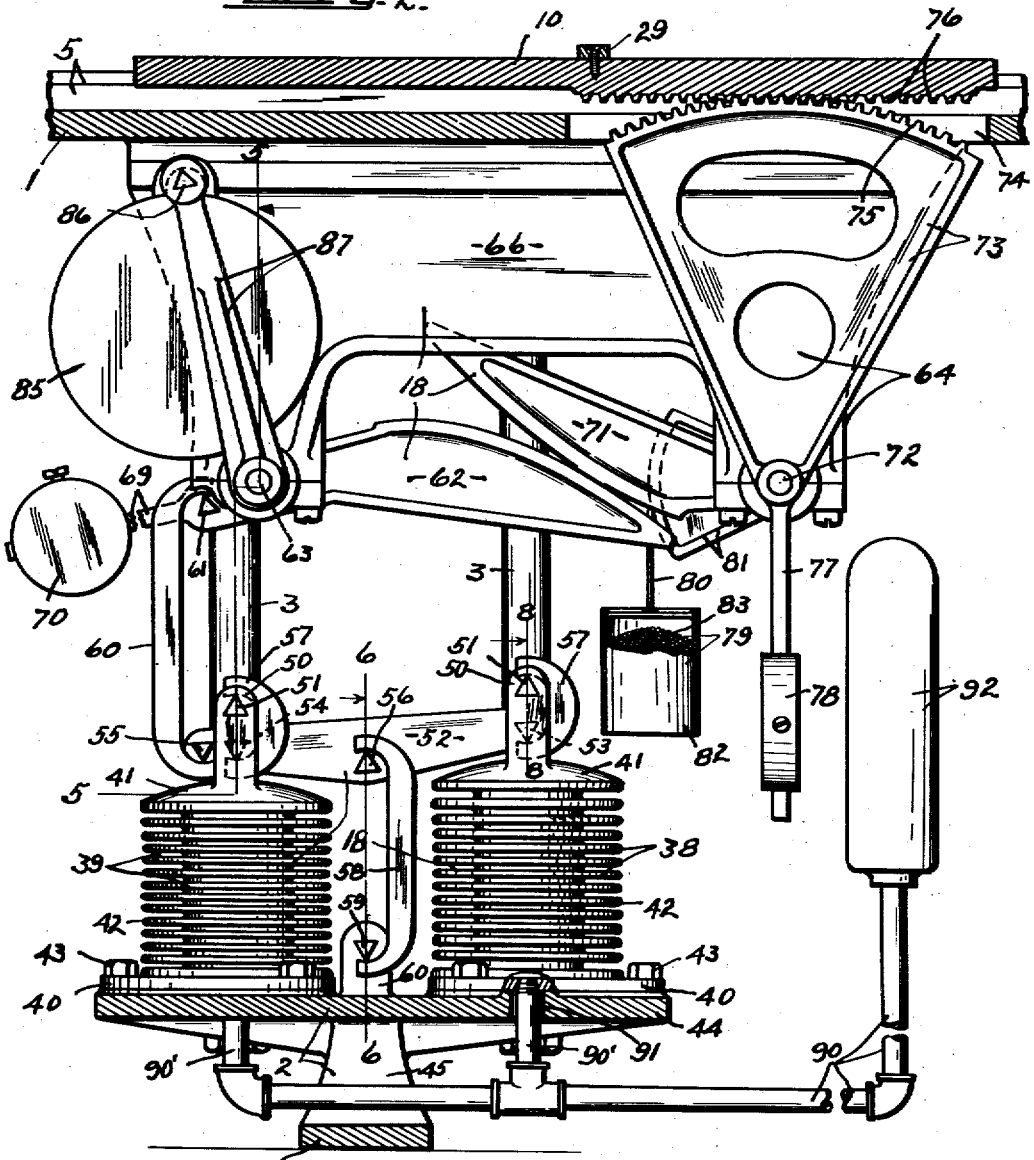
Figure 2 is an enlarged longitudinal vertical sectional view through one of the slide members, and the thermostatic control unit therefor, taken substantially in the plane of the line 2—2, Figure 1.
Figure 4:
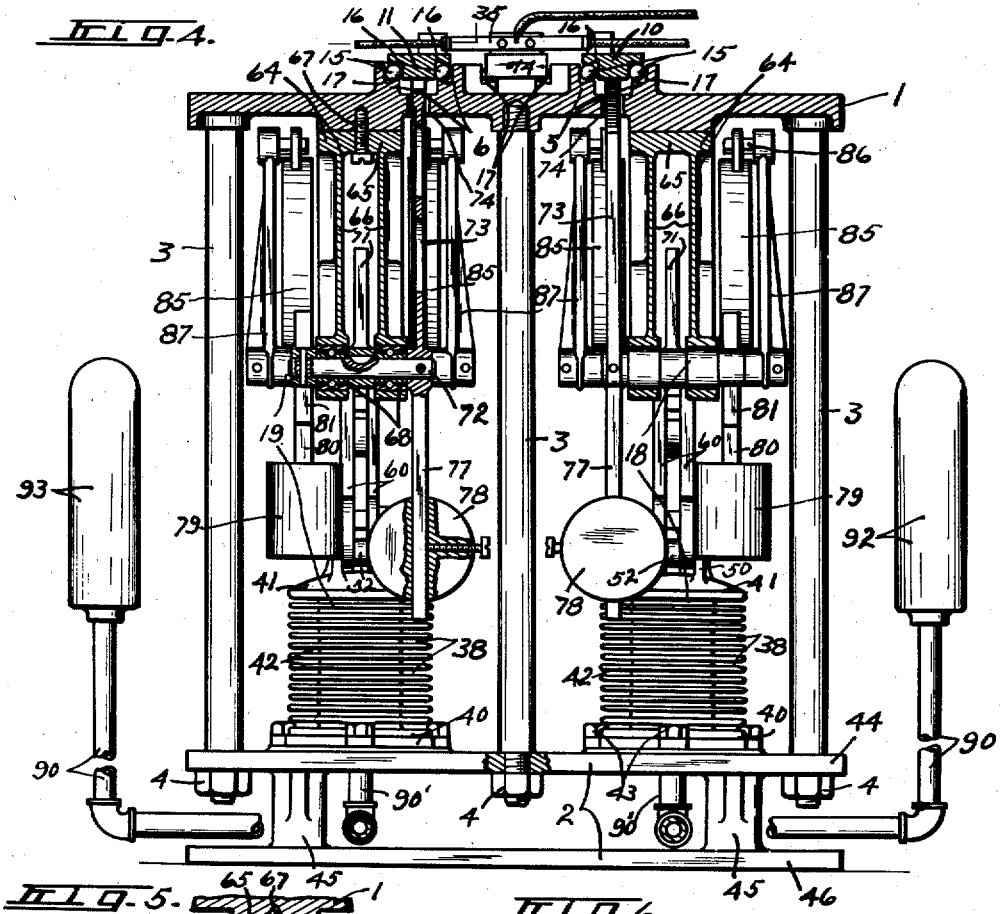
Figure 4 is an enlarged transverse vertical sectional view taken in the plane of the line 4—4, Figure 1.

As the thermostatic units 18, 19, 20 and 21 are constructed and operated similarly there will be but one of these units described, namely, the thermostatic unit designated 18, which is operably connected with the slide 10, and which is shown more particularly in Figures 2 and 4. This thermostatic unit 18 consists of a thermo-sensitive member or bulb and an actuating member connected in a fluid-tight manner. The thermo-sensitive member or bulb is partially filled with a volatile fluid, the temperature and pressure characteristics of which are suitable for range and scope of the instrument. The actuating member consists of a pair of pressure operated Sylphon tubes or bellows 38 and 39, each comprising a base 40 and a head 41 connected by a corrugated tube 42 which is secured at respective ends to the base 40 and head 41 in a fluid-tight manner.

The bellows 38 and 39 are secured to the platform 2 positioned below the respective end of the table 1 at which the thermostatic unit is positioned by means of, in this instance, three bolts or screws 43 which extend through suitable holes provided in the base 40, and are screw-threaded in platform 2. The supporting platforms 2 may consist of substantially rectangular flat members 44 composed of metal, wood or the like, and may as shown, have a pair of pendant legs 45 positioned near either end thereof, and which are tied together at their lower ends by a suitable foot or bar member 46 adapted to support the platform 2, and therefore, the remainder of the units comprising the instrument upon a shelf or other suitable supporting means.

Each bellows head 41 is provided with an opening 47, and each opening 47 may be closed in a fluid-tight manner by a suitable plug 48 screw-threaded therein.

Figure 5:
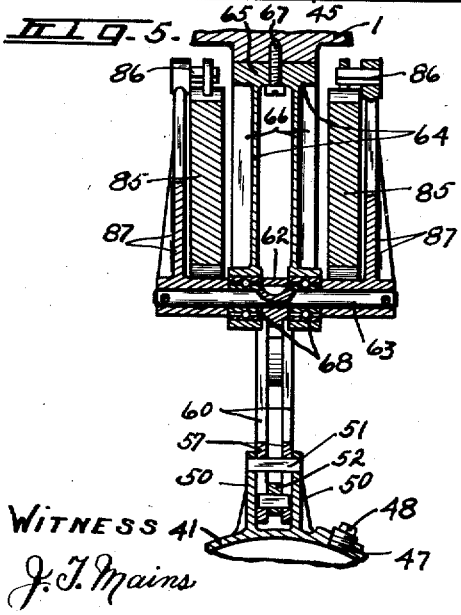
Figure 5 is a detail vertical sectional view taken substantially in the plane of the line 5—5, Figure 2.
Figure 6:
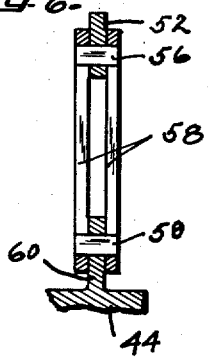
Figure 6 is a detail vertical section taken on line 6—6, Figure 2.

Each head 41 is also provided with a pair of upwardly projecting spaced lugs or ears 50 which have secured in the outer ends thereof, a fulcrum bar 51 composed of tempered steel or the like. These bars 51 extend between the ears, as shown more particularly in Figure 5, and are triangular in cross section with one of the wedge-shaped edges arranged at the top thereof for pivotally supporting an equalizing bar 52 which is positioned between the ears 50, and extends from over one Sylphon tube to the other Sylphon tube.

This equalizing bar 52 is provided with a plurality of, in this instance, four wedge-shaped fulcrum bars as 53, 54, 55 and 56. These fulcrum bars are made substantially similar to the fulcrum bar 51 and extend a relatively short distance beyond either side face of the equalizing bar.

Two of the fulcrum bars as 53 and 54 are for the purpose of pivotally connecting the bar with respective bellows 38 and 39.

Figure 8:
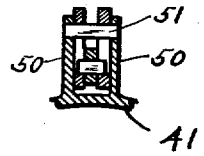
Figure 8 is a detail section on line 8—8, Figure 2.

One of the fulcrums as 53 is positioned near one end of the equalizing bar 52 while the other fulcrum 54 is positioned a short distance from the other end of said equalizing bar and each of the fulcrums is pivotally connected with the respective fulcrum bars 51 connected with the bellows by a pair of crescent shaped pivotal links 57 composed of tempered steel or the like, and positioned one at either side of the equalizing bar 52 and between the respective ears 50. (See Figure 8).

A third fulcrum bar as 55 is mounted in the equalizing bar 52 at the end adjacent the fulcrum bar 54 for pivotally connecting the bar and therefore, the bellows 38 and 39 with a suitable slide-actuating mechanism presently described.

The fourth fulcrum bar as 56 is connected with the equalizing bar 52 midway between the two end fulcrum bars 53 and 55. The equalizing bar 52 is pivotally connected with the platform 2 by a pair of fulcrum links 58 also composed of tempered steel, and which have their lower ends pivotally engaging the lower knife-like edge of a fulcrum bar 59 mounted to extend outwardly from opposite sides of an upwardly extending arm 60 secured to or made integral with the platform 2.

It will thus be seen by referring more particularly to Figure 2, that the equalizing bar 52 is supported at unequal distances either side of its center, that is, the fulcrum 56, by the respective bellows 38 and 39, while the equalizing bar is maintained against bodily upward movement by the platform 2 through the medium of the fulcrum links 58 at a point equidistant from either end of the fulcrums 53 and 55 so that as equal forces are applied to the equalizing bar 52 by the gas pressure in each Sylphon tube, there will be a slight rocking movement of the equalizing bar about the central fulcrum 56 due to the differences in leverages of the tubes thus obtained until a balance in forces is reached in a manner hereinafter more fully explained.

This pivotal movement of the equalizing bar 52 is utilized to reciprocate the particular slide as 10 connected with the thermostatic unit in the following novel manner.

Since the temperature pressure characteristics of a volatile fluid are such that the pressure increases in progressively increasing increments with equal increments of temperature, and since it is desirable that the registering member of an instrument of this kind be moved with a uniform motion along its path to correspond with uniform changes in temperature, it is evident that a compensating mechanism must be interposed between the actuating member of the thermal couple and the registering member of the unit.

It is also essential that the registering member assumes a definite position for any definite temperature; therefore, the forces acting through the compensating mechanism must be in static balance at any temperature within the range of the instrument.

It may be conceived that the instrument is divided into two portions, the actuating side which is subjected to unequal increments of pressure with equal increments of temperature, and the registering side having equal increments of motion but actuated by unequal increments of pressure.

Between the two sides is interposed the compensating mechanism consisting of a pair of cooperating cam levers 62 and 71 so designed and so disposed one to the other that the force due to the pressure within the actuating member of the thermal couple is transmitted through the cooperating cam levers and is held in static balance by an opposing force provided in connection with the registering side of the instrument.

Since a freely suspended weight subject to gravitation is simple and unvarying in intensity, this has been chosen as the method whereby the force transmitted from the actuating member, tubes 38 and 39 of the thermal unit, is opposed and balanced.

A pair of vertically disposed fulcrum links 60 is fulcrumed at their lower ends to the fulcrum bar 55 positioned at the outer free end of the equalizing bar 52 while the upper ends of these links are pivotally connected with a fulcrum bar 61 secured to a cam lever 62 and which extends from opposite sides of the lever and is positioned at a relatively short distance outwardly from the axis thereof.

This cam lever 62 is secured in any suitable manner to a horizontally disposed rock shaft 63 which, in turn, is journaled at the lower side adjacent one end of a pendant lever supporting frame 64.

This frame 64 is comprised of a base 65 having a pair of spaced downwardly extending sides 66. The frame 64 is secured by screws 67 or other suitable means to the bottom of the table 1 beneath and at one side of the slide guideway with which the control unit is adapted to operate as, in this instance, guideway 5. (See Figures 2 and 4.)

The rock shaft 63, in this instance, is journaled in a pair of roller bearings 68 mounted, one in the lower face of each side wall 66 of the frame 64 at one end thereof.

The cam lever 62, in this instance, is mounted upon the shaft 63 between the side walls 66 of said frame, and therefore between the bearings 68, and extends outwardly in a substantially horizontal plane from the shaft 63 away from the frame 64 to form an arm 69 upon which is adjustably mounted a suitable weight 70 which is adapted to counter-balance the cam lever 62. This cam lever proper extends outwardly from the shaft 63 towards the opposite end of the frame 64, and is adapted to co-operate with a second cam lever 71 which extends over the first mentioned cam lever 62 in contact therewith for actuating a second rock shaft 72 which is journaled at the opposite end of the frame 64 to that in which the shaft 63 is journaled.

This shaft 72, like the rock shaft 63, is journaled in roller bearings similar to the bearings 68 for the shaft 63 which are mounted in the lower face of each side wall 66 of the frame 64 in the same manner in which the bearings 68 are mounted for the shaft 63.

A gear segment 73 is secured to the rock shaft 72 adjacent one side of the frame 64 and extends upwardly from the shaft through a suitable elongated slot 74 provided in the table 1 between the guide rails constituting the guide members 5.

The gear teeth as 75 of the gear segment 73 are in meshing engagement with corresponding rack teeth 76 formed on the bottom face of the slide member 10 so that any rocking movement of the gear segment 73 will produce a corresponding longitudinal movement of the slide 10.

The gear segment 73 is provided with a pendant arm 77 which extends below the axis of the segment gear and has adjustably secured thereto, a weight 78 adapted to counterbalance the segment gear and thus provide for the free uniform rocking movement of the segment gear in all positions.

In order that the slide 10 may be actuated in one direction, and that the pressure of the cam lever 71 upon the companion cam lever 62 will vary in inverse proportions to the distance of contact points of the two levers from the axis of the rock shaft 72, a second weight 79 is connected by a cable 80 to the arcuate outer vertical edge of a rock arm 81 which is secured to the rock shaft 72 at the opposite side of the frame 64 to that at which the segment gear 73 is positioned.

The weight 79, in this instance, is composed of a receptacle 82 adapted to contain relatively small particles of weighing material 83 such as shot, so that a very accurate adjustment may be obtained by the addition of more or less weight to the rock arm 81.

The outer curved surface of the rock arm 81 is made concentric with the shaft 72 so that an even pull will be exerted by the weight upon the rock arm and shaft 72 throughout the entire range of movement of said rock arm.

It will be noted by referring to Figure 2, that the adjacent contacting edges of the cam levers 62 and 71 are curved from the point of contact thereof outwardly in opposite directions, and this curvature is such that the point of contact between the two cam levers 62 and 71 will always be in a plane passing through the axes of the two rock shafts 63 and 72.

The contacting curvatures of the two cam arms 62 and 71 are so designed that equal increments of temperature, to which the thermometer bulb 92 may be subjected, will cause a corresponding equal increment of rotation of the follower cam arm 71 and, therefore, of the gear segment 73.

Also the contacting curvatures of the two cam arms are so plotted that the slide, as 10, actuated thereby, is caused to be moved along the guideways in the same relation to the co-acting slides as the scales on a thermometric chart corresponding to the slides bear to each other, as will hereinafter be more apparent.

It may now be understood that the unbalanced force exerted upon the equalizing bar 52 by the gas pressure in the Sylphon tubes, will exert a reactive pull in the links 60 which will be transmitted through the cam levers 62 and 71, the rock shaft 72 and the rock arm 81 to the weight 79.

As previously explained, the point of contact between the cam levers 62 and 71 will always be at varying points along a straight line between the axes of rock shafts 63 and 72; therefore, the ratio of leverages interposed between the pull exerted by the fulcrum links 60 and the weight 79 will vary with the increase or decrease in the intensity of said pull.

As a result of this construction and the curvilinear form of the contact surfaces between the cam levers, the constant weight 79 will always hold in equilibrium varying intensities of pull exerted upon the links 60 by the lever 52.

Of the two Sylphon tubes, which are equal in sectional area and are subjected always to equal gas pressures which will vary in accordance with the temperature to which their respective thermo-sensitive member as a thermometer bulb 92, is subjected, the tube 38 supplies the operating force. The function of the Sylphon tube 39, whose point of contact with the equalizer bar 52 is at a shorter distance from the fulcrum 56 than the contact point of the operating tube 38, is to partially counteract the force exerted by the operating tube 38. Thus, a very sensitive but positive pivotal movement of the equalizing bar 52 is produced.

From the foregoing, it will be evident that the slide, as 10, will assume a certain and definite position for any definite temperature to which the thermometer bulb 92 may be subjected.

Owing to the fact that the corrugated tubes 42 of the bellows 38 and 39 are of metallic construction, a certain definite resistance will be exerted against any movement of either expansion or contraction, this resistance being similar to the action of a coil spring.

In order to counter-balance this structural resistance which otherwise would impair the accuracy of the unit, I have provided a pair of counter-weights 85 which are pivotally mounted upon respective fulcrum bars 86 secured to respective, upwardly extending, rock arms 87 positioned one at either side of the frame 64 and mounted upon the adjacent ends of the rock shaft 63 to move therewith.

In adjusting the instrument, the bellows 38 and 39 are allowed to assume their "free" or normal length, being neither in compression nor extension.

When the bellows 38 and 39 are in this position, the equalizer bar 52 is suspended in a horizontal position by the links 57, the center line of the gear segment 73 assuming a vertical position and the slide 10 midway of its travel in either direction. The arms 87 are then positioned vertically over the axis of the rock shaft 63 thus supporting the weights 85 in such a manner that their centers of gravity will be in a plumb line above the axis of the rock shaft 63 and, therefore, are exerting no tendency to rotate said shaft.

When, in operation, the gas pressure in the bellows 38 and 39 is sufficient to overcome the pull exerted by the weight 79, acting through the intermediate mechanism, bellows 38 will extend, bellows 39 will be compressed and the weights 85 will be moved outwardly from their plumb position above the rock shaft 63 thus tending to rotate said shaft by a force equal and opposite to the structural resistance offered by bellows 38 in extending and bellows 39 in compressing.

Conversely, should the pull exerted by the weight 79 through the intermediate mechanism be sufficient to overcome the action of the gas pressure in the bellows 38 and 39 when the unit is in its mid-position, the bellows 38 will be compressed, bellows 39 will extend and the weights 85 will move inwardly from their plumb position above shaft 63 thus tending again to rotate this shaft by a force equal and opposite to the structural resistance offered by the bellows.

It is now evident that I have provided a very delicately balanced extremely sensitive mechanism for actuating the slide 10, and as the slides 11, 12 and 13 are each provided with a similar thermostatic actuating unit and with the Sylphon bellows 38 and 39 of each unit connected with a hereinbefore mentioned thermosensitive member such as a dry bulb thermometer or with a wet bulb thermometer, it is also obvious that each of these slides will be caused to assume a definite position along their respective guides for any definite atmospheric condition.

These bellows 38 and 39 may be connected with the respective bulb thermometer in any suitable manner such as a tube 90 which is connected at one end with the interior of each bellows by means of a relatively short pipe or tube 90′ which extends upwardly through a respective aperture 91 provided in the platform 2, and are screw-threaded in the center of respective base members 40 while the other end of the tube 90 is operably connected in any well known manner to the respective dry or wet bulb thermometer 92 or 93, as the case may be.

These bulbs for operating the various thermostatic actuating units may be supplied with any suitable liquid, whose boiling point temperatures and pressures range within the desired limits, such as ethyl chloride.

Figure 10:
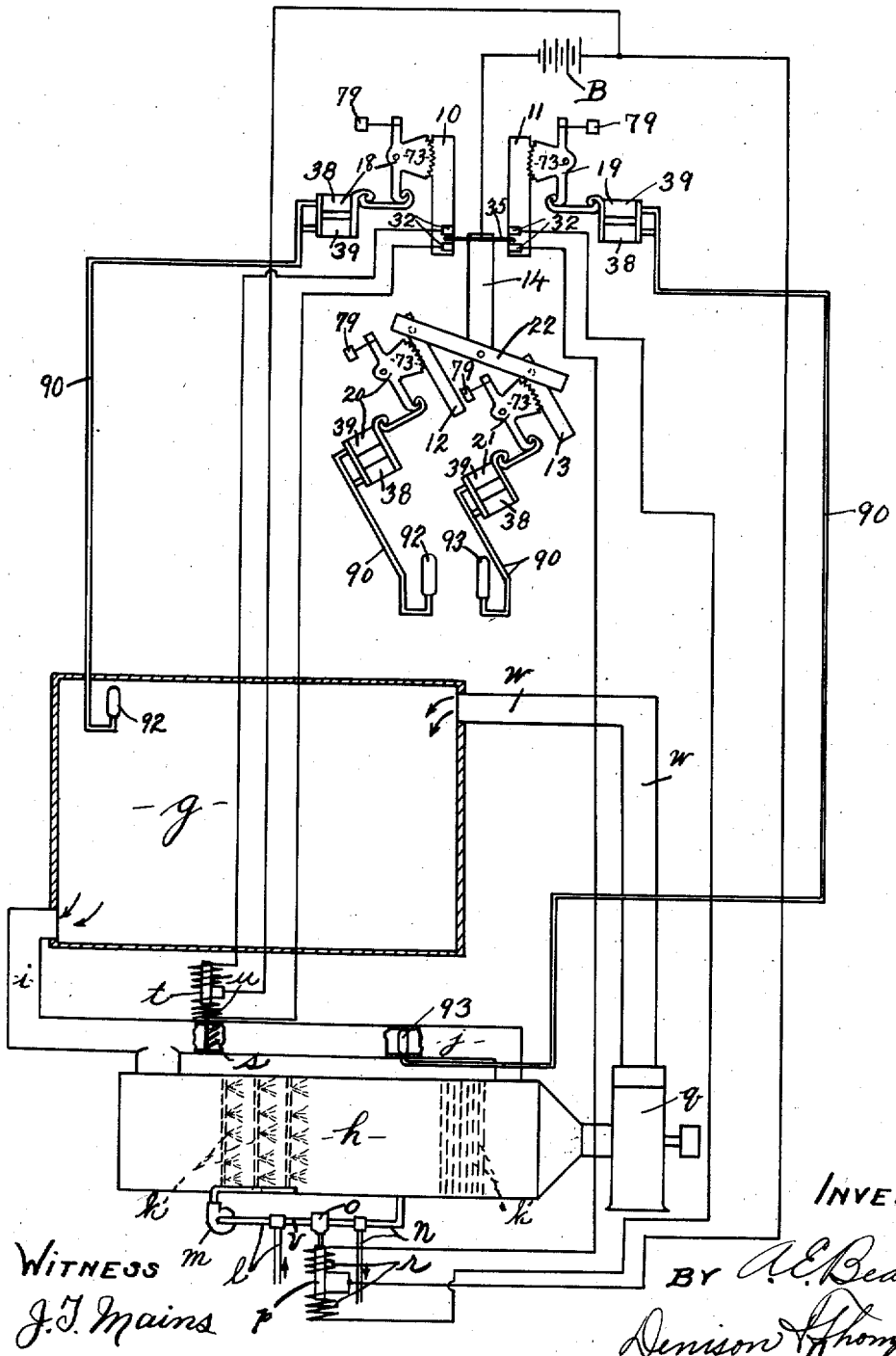
Figure 10 is diagrammatic view illustrating the manner in which my novel control apparatus may be operably connected with an air conditioning and circulating system.

In Figure 10, I have illustrated diagrammatically a conventional air conditioning system in connection with an inclosure, together with my novel air conditioning control instrument and the means by which this instrument may be operably connected with the system.

The air conditioning unit, as illustrated, consists of an air conditioning chamber *h* connected at one end by a suitable conduit *i* with the inclosure *g*. The other end of the chamber *h* may be connected, as shown, by a second conduit *j* to the conduit *i* for admitting air to the chamber ahead of a plurality of water sprays *k* and a series of baffle plates *k′* positioned in the chamber intermediate its ends.

The sprays *k* are supplied from a refrigerated source *l* through a pump *m* and the warmed water is withdrawn from the spray chamber *h* through the pipe *n* and returned to the source of refrigeration for re-circulation.

A by-pass connection *v* is provided between the drain pipe *n* and the supply pipe *l* in which is interposed a valve *o* thus permitting the water drained from the chamber *h* to be returned to the refrigerated source or to be delivered directly to the circulating pump *m*. By manipulating the valve *o*, any desired temperature of the spray water may be obtained, ranging from the cold temperature of the refrigerated source, to the warmer temperature of the water drained from the chamber *h*.

In accordance with well established thermal laws, the maximum amount of vapor possible to be present with a definite volume of air, is a function of the temperature of the mixture; the higher the temperature, the greater the amount of vapor.

If the atmosphere in an inclosure is to be maintained at some definite temperature and degree of relative humidity, all moisture introduced therein, in excess of the desired amount, must be removed by the circulating air. In order that the circulating air may have the capacity for absorbing this excess vapor, its temperature upon leaving the air conditioning unit must be sufficiently below that of the inclosure so that its vapor at saturation, plus the excess vapor to be absorbed, will result in a mixture of the desired relative humidity when at the temperature of the inclosure.

In other words, the greater the amount of vapor to be removed from the inclosure, the lower must be the temperature of the circulating air leaving the air conditioning unit and, consequently, the temperature of the water in the sprays *k* must vary inversely with the amount of vapor to be removed from the inclosure.

Since the degree of relative humidity affects the reading of a wet bulb thermometer without in any way changing that of a dry bulb thermometer, the temperature of the spray water *k* may be varied to suit varying conditions of humidity by operating the by-pass valve *o* by means of a thermostat responsive to wet bulb conditions. To accomplish this, the operating stem of the valve *o* may be connected to a magnetic core *p* operably disposed to function forward and backward under the alternate influence of two oppositely positioned solenoids *r*.

A fan *q* is connected with the air conditioning chamber *h*, as shown, for drawing air from the inclosure through said conditioning chamber, and it has an outlet conduit *w* connecting the fan with the inclosure *g* for returning air to said inclosure.

A suitable damper *s* is inserted in the by-pass conduit *j* intermediate its ends. For opening and closing the damper *s*, said damper is operably connected to a magnetic core *t* designed to function forward and backward under the alternate influence of two oppositely disposed solenoids *u*.

In order to maintain a definite temperature in the inclosure, all heat injected therein must be removed by the circulating air and as the temperature of the circulating air after passing through the water sprays is determined by the wet bulb temperature in the inclosure, the volume of air passing through the sprays *k* will measure the amount of refrigeration supplied to the inclosure and this must equal the heat injected therein.

By manipulating the damper *s*, a varying quantity of air may be forced to pass through the cooling spray water in accordance with the refrigeration requirements of the inclosure. Since the heat introduced within the inclosure affects directly the dry bulb thermometer and only indirectly the wet bulb thermometer, as that reading is modified by the amount of vapor present, the refrigeration requirements will be indicated by the rise or fall of the dry bulb temperature above or below a predetermined point. Therefore, to maintain a predetermined definite temperature, with varying amounts of heat introduced into the inclosure, it is only necessary to manipulate the damper *s* in the by-pass conduit *j* by means of a thermostat responsive to a dry bulb temperature.

Each of the solenoid coils *r* and *u* may have the electric circuit therefor automatically controlled by my novel control instrument for opening or closing the valve *o* and the damper *s* in the following manner and thereby automatically controlling the conditions of the air in the inclosure *g*:

The contact bar 35, connected with the slide 14 may be, as shown, electrically connected with one side of a source of potential as a battery B or from an outside source of current. The terminals 32 carried by the slide 10 of the dry bulb operated thermostat 18 may be electrically connected each with its respective solenoid *u*, as shown, which, in turn, are electrically connected with the opposite side of the battery B.

Likewise, each of the terminals 32 attached to the slide 11 of the wet bulb operated thermostat 19, may be electrically connected to its respective solenoid *r*, as shown, which are also connected to the battery B. Thus a contact of the bar 35 with either of the terminals 32 attached to the slide 10 will produce an electric current through its respective solenoid *u* and the magnetic force thus set up will move the core *t* in a corresponding direction to open or close the damper *s*. Also a contact of the bar 35 with either of the terminals 32 carried by the slide 11 will produce an electric current through its respective solenoid *r* moving the core *p* in a corresponding direction to open or close the valve *o*.

In conventional air conditioning systems, a fairly constant dry bulb temperature may be maintained in an inclosure by the manual manipulation of a thermostat furnished as part of the equipment and which is responsive to the temperature of the inclosure irrespective of the number of people in the inclosure, but the relative humidity and consequently, the effective temperature constantly varies in proportion to the number of persons present.

Although an infinite variety of dry and wet bulb temperatures may produce one or the same effective temperature, and may feel equally comfortable, they do not all seem to be conducive to health, and therefore, for ideal conditions, a fairly constant degree of relative humidity should be maintained, and this has been determined through extensive experimental processes to average approximately 55%. In other words, instead of maintaining a constant dry bulb temperature in an auditorium or inclosure a constant degree of relative humidity should be the object of air conditioning.

It is also quite generally conceded that the best average effective temperature which has been found to produce the maximum comfort for persons normally clothed, at rest, and in still air, is 66 degrees, and since the sudden contrast between this condition and the high effective temperatures to be experienced on the outside during the summer months is productive of considerable discomfort, it is proposed to maintain an effective temperature in the auditorium or inclosure which shall be midway between the effective temperature outside and 66 degrees effective temperature.

In Figure 11 of the drawings is illustrated a thermometric chart for comfort which shows the relation between the outside effective temperatures and the conditions to be maintained inside, if the inside effective temperature is maintained midway between the outside effective temperature and 66 degrees effective temperature, and at the same time maintaining a relative degree of humidity on the inside at 55%. By referring to this chart, it will be noted that the vertical lines *e'* represent the outside effective temperatures, the oblique full lines *a'* and *b'* represent the inside dry bulb temperature, and the inside wet bulb temperature respectively, and that the oblique broken line *f* represents the inside effective temperature.

*Operation*

Assuming that the slide 12 has the Sylphon tubes or bellows 38 and 39 comprised in its thermostatic actuating unit connected with a dry bulb 92 which is maintained in the outside atmosphere, and that the slide 13 has its respective thermometric actuating unit connected with a wet bulb 93 also positioned in the outside atmosphere, it will be evident that these slides 12 and 13 will be moved longitudinally along their respective guides 7 and 8 in accordance with any variation in the temperature of the outside atmosphere, and also with any variation in the relative degree of moisture.

It may now be observed that due to the particular construction and operation of the respective thermostatic actuating units connected therewith, these slides will have a longitudinal movement along their respective guides depending upon the action of the atmosphere upon the respective bulbs, and that the movement of the slides will be independent of each other, and at the same time, will have the same relative position one to the other which the outside dry and wet bulb scales *c* and *d* bear to each other. (See Figure 1.)

It is also evident that the bar 22 being pivotally connected with the slide 14 and also having a free sliding engagement with points fixed upon the slides 12 and 13, the slide 14 will be actuated by both or either slide 12 or 13 along its guide 9. Therefore, the slide 14 will assume a definite position relative to the positions of the dry and wet bulb slides 12 and 13 due to the angular relation of movements of the slide 14 and the slides 12 and 13, which will indicate the outside effective temperature corresponding thereto, which is indicated by the scale *e* adjacent the slide 14 in Figure 1, and by the vertical lines *e'* in Figure 11.

It will also be understood that by connecting the thermostatic actuating unit for the slide 10 with a dry bulb 92 positioned within the inclosure, and by connecting the thermostatic actuating unit for the slide 11 with a wet bulb 93 positioned in any suitable place for being effected by the degree of moisture contained in the inclosure *g* as in the air outlet conduit *j* leading to the conditioning chamber *h*, these slides will be moved along their respective guides 5 and 6 in the same relative relation which the inside dry bulb temperature scale *a'* and the inside wet bulb temperature scale *b'* bear to each other on the thermometric comfort chart. (See Figure 11.)

In other words, if the outside wet and dry bulb temperatures are such as to produce an outside effective temperature of eighty degrees, which as indicated by the scales *a* and *c* in Figure 1, may be 71½ degrees and 90 degrees respectively, then the inside dry bulb temperature will be 78 degrees, and the inside wet bulb temperature will be 66½ degrees as indicated by the scales *a* and *b* respectively in Figure 1, or by lines *a'* and *b'* in Figure 11, and therefore, the inside effective temperature will be 73 degrees, as indicated by the chart in Figure 11, with the relative humidity of 55%, and the contact bar 35 will be positioned intermediate the respective yielding contact members 32 connected with the slides 10 and 11.

Should either the temperature in the inclosure or the percentage of moisture thereof vary, a corresponding movement of the respective dry or wet bulb slides 10 and 11 will result, and the contact bar 35 will be brought into electrical connection with one or another of the yielding contact members 32.

If, for instance, an accession of heat is introduced into the inclosure, the dry bulb temperature will rise, the slide 10 will move outwardly and the lower terminal 32, as viewed in Figure 10, will contact with the bar 35, thus setting up an electric current through the lower solenoid *u*. The core *t* will be pulled downwardly, closing the damper *s* and forcing an increased volume of air through the cooling sprays *k* thus increasing the amount of refrigeration furnished the inclosure to meet the said accession of heat.

Due to the increased quantity of air passing through the sprays, the temperature of the water will rise and the temperature of the air leaving the conditioning chamber *h* will be increased. Its moisture carrying capacity will thus be reduced, increasing the wet bulb temperature and the slide 11 will likewise move outwardly effecting a contact between the bar 35 and the lower contact terminal in slide 11. An electric current will be sent through the upper solenoid *r* which will move the magnetic core *p* upwardly to close the valve *o* thus increasing the amount of water drawn from the refrigerated source and injected into the sprays *k*. The temperature of the sprays *k* will be lowered and consequently the temperature of air leaving the same will be reduced to the required point.

It will thus be seen that an increased demand for refrigeration will be met by passing an increased quantity of air through the cooling spray water and by an increased range of temperature in an unvarying quantity of sprays.

These conditions will prevail until the predetermined balance is reached when the slides 10 and 11 will again assume such positions that the contact between the bar 35 and the terminals 32 is again discontinued.

Conversely, should the demand for refrigeration in the inclosure *g* be decreased, the slide 10 will move inwardly making contact with the upper terminal in Figure 10, when a current will be set up through the upper solenoid *u*, opening the bypass damper *s* thus reducing the quantity of air passing through the sprays *k*. This action will result in lowering the temperature of the air leaving the conditioning device and increasing its moisture carrying capacity, thus lowering the wet bulb temperature in the inclosure and moving the slide 11 inwardly thereby making contact opposite to that previously described and increasing the temperature of the cooling water injected into the sprays.

From the foregoing, it will be seen that any motion of either or both of the slides 12 and 13 will effect a corresponding differential movement, either outwardly or inwardly, of the slide 14. Any movement of the slide 14 will bring the bar 35 into contact with one or the other of the terminals attached to the slides 10 and 11 with the consequent effect of modifying either or both the temperature or volume of air passing through the conditioning chamber *h*.

Therefore, any variation in conditions of the outside atmosphere will be transmitted through the effective temperature slide 14 and the coactive slides 10 and 11 to maintain an atmospheric condition within the enclosure which shall be in definite relation to the effective temperature prevailing outside at any time.

It will, therefore, be seen that any changes occurring in either the dry bulb temperature or the wet bulb temperature, or in both, in either the outside air or the inside air will, through the respective dry or wet bulbs, so affect the corresponding slides in my novel control instrument as to cause the air conditioning system to automatically maintain an inside effective temperature which will have the same relation to the outside effective temperature as the inside effective temperature scale or curve bears to the outside effective temperature scale or curve, as indicated in Figure 11.

It is evident that while I have illustrated and described a particular embodiment of my invention and the means of operably connecting my novel control instrument with a specific air conditioning system, this may be altered materially in that an entirely different electrical hook-up may be employed, or the slides 10 and 11 may be operably connected with other units of the conditioning system, and that various changes in construction of my control instrument and in the form and relation of the parts thereof may readily be made without departing from the spirit of this invention, as set forth in the appended claims.

I claim:

1. A control instrument for air conditioning systems comprising an outside effective temperature slide, operating means connected with the slide for moving said slide in accordance with the effective temperature curve of the outside air, and means co-acting with the slide and actuated by the dry and wet bulb temperatures of the inside air adapted to automatically control the operation of an air conditioning system for maintaining the inside effective temperature at a predetermined relation to the outside effective temperature.

2. A control instrument for air conditioning systems comprising an outside effective temperature slide, operating means connected with the slide for moving said slide in accordance with the effective temperature curve of the outside air, a dry bulb slide, a wet bulb slide, means operated by the inside dry bulb temperature for moving the dry bulb slide in accordance with the inside dry bulb temperature, a separate means operated by the inside wet bulb temperature for moving the wet bulb slide in accordance with the inside wet bulb temperature, and co-operating means connected with each of said slides and adapted upon relative movement of the slides, to automatically control the operation of an air conditioning system for maintaining the inside effective temperature at a predetermined relation to the outside effective temperature.

3. A control instrument for air conditioning systems comprising an outside effective temperature slide, means connected with the slide and actuated by the dry and wet bulb temperatures of the outside air for moving said slide in accordance with the effective temperature curve of the outside air, and means co-acting with the slide and actuated by the dry and wet bulb temperatures of the inside air adapted to automatically control the operation of an air conditioning system for maintaining the inside effective temperature at a predetermined relation to the outside effective temperature.

4. A control instrument for air conditioning systems comprising an outside effective temperature slide, means connected with the slide and actuated by the dry and wet bulb temperatures of the outside air for moving said slide in accordance with the effective temperature curve of the outside air, and means co-acting with the slide and thermostatically actuated by the dry and wet bulb temperatures of the inside air adapted to automatically control the operation of an air conditioning system for maintaining the inside effective temperature at a predetermined relation to the outside effective temperature.

5. A control instrument for air conditioning systems comprising an outside effective temperature slide, thermostatic operating mechanisms connected with the slide and actuated by the dry bulb temperature and wet bulb temperature of the outside air for moving said slide in accordance with the effective temperature curve of the outside air, and means co-acting with the slide and actuated by the dry and wet bulb temperatures of the inside air adapted to automatically control the operation of an air conditioning system for maintaining the inside effective temperature in accordance with an inside effective temperature curve.

6. A control instrument for air conditioning systems comprising an outside effective temperature slide, a dry bulb slide, a wet bulb slide, means operated by the outside dry bulb temperature for moving dry bulb slide in accordance with the outside dry bulb temperature, separate means operated by the outside wet bulb temperature for moving the wet bulb slide in accordance with the outside wet bulb temperature, means connecting the effective temperature slide with said dry and wet bulb slides whereby the effective temperature slide will be moved by the dry and wet bulb slides in accordance with the effective temperature curve of the outside air, and means co-acting with the effective temperature slide and actuated by the dry and wet bulb temperatures of the inside air adapted to automatically control the operation of an air conditioning system for maintaining the inside effective temperature at a predetermined relation to the outside effective temperature.

7. A control instrument for air conditioning systems comprising an outside effective temperature slide, a dry bulb slide, a wet bulb slide, means operated by the outside dry bulb temperature for moving dry bulb slide in accordance with the outside dry bulb temperature, separate means operated by the outside wet bulb temperature for moving the wet bulb slide in accordance with the outside wet bulb temperature, means connecting the effective temperature slide with said dry and wet bulb slides whereby the effective temperature slide will be moved by the dry and wet bulb slides in accordance with the effective temperature curve of the outside air, a second dry bulb slide, a second wet bulb slide, means operated by the inside dry bulb temperature for moving said second dry bulb slide in accordance with the inside dry bulb temperature, a separate means operated by the inside wet bulb temperature for moving said second mentioned wet bulb slide in accordance with the inside wet bulb temperature, and co-operating means connected with the effective temperature slide and with the second mentioned dry and wet bulb slides adapted upon relative movement of either or both of the second mentioned slides and the effective temperature slide to automatically control the operation of an air conditioning system for maintaining the inside effective temperature at a predetermined relation to the outside effective temperature.

8. A control instrument for air conditioning systems comprising an outside effective temperature slide, a dry bulb slide and a wet bulb slide mounted to move in parallelism and at an angle to the effective temperature slide, means operated by the outside dry bulb temperature for moving the dry bulb slide in accordance with the outside dry bulb temperature, separate means operated by the outside wet bulb temperature for moving the wet bulb temperature slide in accordance with the outside wet bulb temperature, means connecting the effective temperature slide with said dry and wet bulb slides whereby the effective temperature slide will be moved by the dry and wet bulb slides in accordance with the effective temperature curve of the outside air, and means co-acting with the effective temperature slide and actuated by the dry and wet bulb temperatures of the inside air adapted to automatically control the operation of an air conditioning system for maintaining the inside effective temperature at a predetermined relation to the outside effective temperature.

9. A control instrument for air conditioning systems comprising an outside effective temperature slide, a dry bulb slide and a wet bulb slide mounted to move in parallelism and at an angle to the effective temperature slide, means operated by the outside dry bulb temperature for moving the dry bulb slide in accordance with the outside dry bulb temperature, separate means operated by the outside wet bulb temperature for moving the wet bulb temperature slide in accordance with the outside wet bulb temperature, means connecting the effective temperature slide with said dry and wet bulb slides whereby the effective temperature slide will be moved by the dry and wet bulb slides in accordance with the effective temperature curve of the outside air, means pivotally connected with the effective temperature slide and slidably connected with the said dry and wet bulb slides whereby a movement of either of the dry or wet bulb slides will produce a differential movement of the effective temperature slide corresponding to the relation the outside dry and wet bulb temperatures have to the outside effective temperature curve, and means co-acting with the effective temperature slide and actuated by the dry and wet bulb temperatures of the inside air adapted to automatically control the operation of an air conditioning system for maintaining the inside effective temperature at a predetermined relation to the outside effective temperature.

10. A control instrument for air conditioning systems comprising an outside effective temperature slide, operating means connected with the slide for moving said slide in accordance with the effective temperature curve of the outside air, a dry bulb slide and a wet bulb slide mounted to move in parallelism with the effective temperature slide, means operated by the inside dry bulb temperature for moving the dry bulb slide in accordance with the inside dry bulb temperature, separate means operated by the inside wet bulb temperature for moving the wet bulb slide in accordance with the inside wet bulb temperature, and co-acting means connected with the effective temperature slide and with said dry and wet bulb slides adapted to automatically control the operation of an air conditioning system for maintaining the inside effective temperature at a predetermined relation to the outside temperature.

11. A control instrument for air conditioning systems comprising an outside effective temperature slide, a dry bulb slide and a wet bulb slide mounted to move in parallelism and at an angle to the effective temperature slide, means operated by the outside dry bulb temperature for moving the dry bulb slide in accordance with the outside dry bulb temperature, separate means operated by the outside wet bulb temperature for moving the wet bulb temperature slide in accordance with the outside wet bulb temperature, means connecting the effective temperature slide with said dry and wet bulb slides whereby the effective temperature slide will be moved by the dry and wet bulb slides in accordance with the effective temperature curve of the outside air, means pivotally connected with the effective temperature slide and slidably connected with the said dry and wet bulb slides whereby a movement of either of the dry or wet bulb slides will produce a differential movement of the effective temperature slide corresponding to the relation the outside dry and wet bulb temperatures have to the outside effective temperature curve, a second dry bulb slide and a second wet bulb slide mounted to move in parallelism with the effective temperature slide, means operated by the inside dry bulb temperature for moving the dry bulb slide in accordance with the inside dry bulb temperature, separate means operated by the inside wet bulb temperature for moving the second mentioned wet bulb slide in accordance with the inside wet bulb temperature, and co-acting means connected with the effective temperature slide and with the second mentioned dry and wet bulb slides adapted to automatically control the operation of an air conditioning system for maintaining the inside effective temperature at a predetermined relation to the outside effective temperature.

12. A temperature control instrument in combination with an air conditioning system comprising thermally expansible and contractible bellows, a movable contact member, means for actuating said contact member in conformity with the outside atmosphere effective temperature curve, two additional pairs of contact members, the members of each pair being adapted to be alternately engaged by the first mentioned contact member, means for shifting one pair of said contact members in conformity with the inside atmosphere dry bulb temperature, a separate means for shifting the other pair of said contact members in conformity with the inside atmosphere wet bulb temperature, and means electrically connecting each pair of contact members with a respective control unit of said conditioning system.

13. In a thermostatic unit responsive to temperature variations, a thermostatic couple consisting of a liquid-containing member adapted to be exposed to temperature variations, a vapor-containing member expansively and contractively responsive to variable vapor pressures, means connecting said liquid-containing member with the vapor-containing member in a fluid-tight manner, an actuating cam, means operably connecting said cam with the vapor-containing member, a follower cam adapted to be operated by said actuating cam, a counter-balancing weight associated with the cams adapted to restrict the motion of said vapor-containing member and to hold the unit in equilibrium against varying pressures within the thermostatic couple.

14. In a thermostatic unit responsive to variable vapor pressures produced by temperature variations, a thermostatic couple, an actuating cam-shaped lever mounted upon a rock shaft, operating means connecting said cam lever with said thermostatic couple, a follower cam-shaped lever mounted upon a second rock shaft, said cam levers being so disposed in relation to each other that the point of contact between said levers will assume variable positions intermediate the two supporting shafts, and a counter-balancing weight adapted to restrict the motion of said follower cam lever, the form of the contacting surfaces of the two cam levers being such that equal increments of temperature variation will produce equal increments of angular motion in the follower lever.

15. An instrument for controlling air temperature and humidity conditions comprising a movable member having a uniform increment of motion corresponding to equal increments of temperature to which the thermo-sensitive member of a thermal couple is exposed, an actuating member of the thermal couple designed to expand and contract, responsive to unequal increments of pressure for equal increments of temperature to which the thermo-sensitive couple of the member is exposed, a pair of co-operating cam levers constrained to rotate each about its respective shaft, the curvilinear surfaces of contact of said levers being such that any expansive or contractive movement of the actuating member of the thermal couple will be translated into uniform motion of the movable member proportional to uniform changes of temperature to which the thermo-sensitive member of the thermal couple is exposed, operating means connecting the actuating member of the thermal couple with one of the cooperating cam levers, and other operating means connecting the second cam lever with the movable member and an opposing force of uniform intensity so disposed that acting through varying ratios of leverages produced by the action of the pair of co-operating cam levers, the instrument will always be in static balance for each definite temperature to which the thermo-sensitive member of the thermal couple may be exposed.

16. An instrument for controlling air temperature and humidity conditions comprising two movable members, one member actuated by a thermostatic couple adapted to utilize evaporative pressure generated by a volatile fluid and responsive to dry bulb temperature changes, the other member actuated by a thermostatic couple adapted to utilize evaporative pressure generated by a volatile fluid and responsive to wet bulb temperature changes, a pair of cam levers operably connecting each movable member with the actuating member of its respective thermostatic couple, electric contact means inter-connecting the two movable members whereby electrical operating means may be set in motion to manipulate its respective function of an air conditioning unit to maintain a predetermined relation of wet bulb temperature with an existent dry bulb temperature.

17. An instrument for controlling air temperature and humidity conditions comprising a thermostatic instrument, one registering member of which is moved responsive to dry bulb temperatures of the outside air, a second thermostatic instrument, the registering member of which is moved responsive to wet bulb temperatures of the outside air, an effective temperature registering member and means connecting said member with both aforesaid dry bulb and wet bulb registering members in such a manner that it moves responsive to the effective temperatures of the outside air, a third thermostatic instrument, the registering member of which moves responsive to a dry bulb temperature within an inclosure, a fourth thermostatic instrument, the registering member of which moves responsive to wet bulb temperatures within the enclosure, two electrical contact means attached to the effective temperature registering member adapted to engage with correlating contact means attached to the inside dry bulb and wet bulb registering members, and means electrically connecting the contacts with a respective control unit of the conditioning apparatus whereby the dry bulb and wet bulb temperatures of the enclosure are regulated in such relation that the effective temperature of the enclosure is maintained at a predetermined relation to the outside effective temperature.

18. An instrument for controlling air temperature and humidity conditions comprising a thermostatic unit in combination with an air conditioning system, whose registering member is responsive to dry bulb temperatures in an enclosure, a second thermostatic unit whose registering member is responsive to wet bulb temperatures in the enclosure, the rate of movement of the dry bulb and wet bulb registering members in relation to each other being the relation which varying dry bulb temperatures bear to corresponding wet bulb temperatures when the relative humidity in the enclosure is to be maintained according to a predetermined amount in relation to the dry bulb temperature, adjustable means electrically co-acting with the dry bulb and wet bulb registering members whereby the dry bulb registering member operates a control unit of the conditioning system to vary the amount of refrigeration supplied to the enclosure and the wet bulb registering member operating a control unit of the conditioning system to vary the temperature of air leaving the conditioning system.

19. An instrument for controlling air temperature and humidity conditions in combination with an air conditioning apparatus comprising a thermostatic instrument, one member of which is responsive to dry bulb temperatures outside an enclosure and a second member responsive to wet bulb temperatures outside said enclosure, means coacting with the aforesaid dry bulb and wet bulb members for moving a registering member in differential relation to the movement of the aforesaid dry and wet bulb members, a third member of a thermostatic instrument responsive to dry bulb temperatures within the enclosure, a fourth member of the thermostatic instrument responsive to wet bulb temperatures within the enclosure, electrical contact means coacting between the differential registering member and the inside dry bulb and wet bulb members whereby a respective control unit of said conditioning apparatus is regulated to vary the inside dry and wet bulb temperatures in accordance with varying conditions prevailing in the air outside the enclosure.

20. In a device for controlling air temperature and humidity conditions in an enclosure in combination with an air cooling apparatus and comprising means for circulating air through the enclosure and through said cooling apparatus, means for controlling the temperature of the air leaving the cooling apparatus, means for controlling the amount of air passing through the cooling apparatus, a registering member, of a thermostatic instrument responsive to dry bulb temperatures within the enclosure, a second registering member of a thermostatic instrument responsive to wet bulb temperatures within said enclosure whose rate of movement in relation to the movement of the first-mentioned registering member is proportional to the relation desired in the enclosure between wet bulb and dry bulb temperatures, coacting means between the two registering members whereby the means for controlling the temperature of air leaving the cooling apparatus is operated to vary said temperature, and adjustable means coacting with the dry bulb registering member whereby the means for controlling the amount of air passing through the cooling apparatus is operated to vary said amount.

21. In a device for controlling air temperature and humidity conditions in an enclosure in combination with an air cooling apparatus and comprising means for circulating air through the enclosure and through said cooling apparatus, means for controlling the amount of air passing through the cooling apparatus, means for controlling the temperature of the air leaving the cooling apparatus, a thermostatic instrument having two registering members respectively responsive to dry bulb and wet bulb temperatures without the enclosure mutually coacting to move a third registering member in differential relation to the movements of the aforesaid dry bulb and wet bulb registering members, two other registering members of the aforesaid thermostatic instrument respectively responsive to dry bulb and wet bulb temperatures within the enclosure and means coacting between the differential registering member with each of inside temperature registering members whereby upon relative movement between the inside dry bulb and wet bulb registering members with the differential registering member, the respective means for controlling the amount of air passing through the cooling apparatus and the means for controlling the temperature of the air leaving the cooling apparatus may be varied to maintain within the enclosure dry bulb and wet bulb temperatures in accordance with varying dry bulb and wet bulb temperatures existing outside the enclosure.

22. In a thermostatic unit responsive to unequal increments of vapor pressure produced by equal increments of temperature variations, a thermostatic couple consisting of a vapor-containing element expansively and contractively responsive to variable vapor pressures, a pair of cam members operatively associated for positively transmitting motion from one to the other, operating means connecting the vapor-containing element with the actuating cam member, and resistance means connected with one of the cam members adapted to exert an even pull upon said cam members throughout the entire range of movement thereof to restrict the motion of said vapor-containing element and to hold the unit in equilibrium against varying pressures within the thermostatic couple.

23. An improved method of temperature and humidity control of air in an enclosure which comprises determining the relation with the wet and dry bulb temperatures of the air inside the enclosure has to the effective temperature of the air outside the enclosure, varying the wet and dry bulb temperatures of a volume of air in accordance with such relative condition, so that when said volume of air is mixed with the air in the enclosure, the effective temperature of said enclosed air will be maintained substantially midway between a predetermined effective temperature and the effective temperature prevailing in the air outside the enclosure.

24. An improved method of temperature and humidity control of air in an enclosure which comprises determining the relation which the psychrometric condition of the air inside the enclosure has to the effective temperature of the air outside the enclosure, varying the wet and dry bulb temperatures of a volume of air in accordance with such relative condition, so that when said volume of air is mixed with the air in the enclosure, the effective temperature of said enclosed air will be maintained intermediate 66 degrees effective temperature and the effective temperature prevailing in the air outside the enclosure.

25. An improved method of temperature and humidity control of air in an enclosure which comprises supplying a volume of air to the enclosure, conditioning said volume of air by controlling the amount thereof which is passed through an air conditioning apparatus, in accordance with the relation which the effective temperature of the air outside the enclosure has to the effective temperature of the air inside the enclosure so that when said volume of air is introduced into the enclosure, the effective temperature of the air within the enclosure will be maintained intermediate a pre-determined effective temperature and the effective temperature of the air outside said enclosure.

26. An improved method of temperature and humidity control of air in an enclosure which comprises passing a stream of air through an air conditioning apparatus to the enclosure, determining the relation which the psychrometric condition of the air inside the enclosure has to the effective temperature of the air outside the enclosure, controlling the operation of the conditioning apparatus in accordance with such relative condition to change the temperature and humidity of the stream of air so that when said treated stream of air mixes with the air in the enclosure, the effective temperature of air within the enclosure will be maintained intermediate a predetermined effective temperature and the effective temperature of the air outside said enclosure.

27. An improved method of temperature and humidity control of air in an enclosure which comprises passing a stream of air through an air conditioning apparatus having a spray chamber therein, determining the relation which the wet bulb temperature of the air inside the enclosure has to the effective temperature of the air outside the enclosure, controlling the temperature of the spray in said chamber in accordance with such relative condition to change the dew point of the air, determining the relation which the dry bulb temperature of the air inside the enclosure has to the effective temperature of the air outside the enclosure, controlling the quantity of air passing through said spray chamber, in accordance with such latter relative condition to govern the temperature of the air leaving the conditioning apparatus, and then introducing said treated air into the enclosure.

28. A device for controlling the temperature and humidity of air in an enclosure which comprises an air conditioning apparatus having an air controlling means and an air cooling means, means for withdrawing air from the enclosure, passing said air through the air conditioning apparatus, and returning the conditioned air to the enclosure; a thermostatic instrument having a plurality of movable members, coacting operating means for one of said members respectively responsive to the dry and wet bulb temperatures outside the enclosure, whereby said member assumes variable positions corresponding to the effective temperature of the outside air, operating means for a second member of the thermostatic instrument responsive to the dry bulb temperature within the enclosure, said second member acting in conjunction with the above first mentioned member for controlling the operation of the air control means, to regulate the amount of air passing through the air conditioning apparatus, to control the dry bulb temperature within the enclosure in a predetermined relation to the effective temperature of the air outside the enclosure, operating means for a third member of the thermostatic instrument responsive to the wet bulb temperature of the air within the enclosure, said third member acting in conjunction with the above first mentioned member for effecting the operation of the cooling means, to regulate the temperature of the air leaving the air conditioning apparatus, to control the wet bulb temperature of the air within the enclosure in a predetermined relation to the effective temperature of the air outside the enclosure.

29. A device for controlling the temperature and humidity of air within an enclosure which comprises an air conditioning apparatus, means for withdrawing air from the enclosure, passing said air through the air conditioning apparatus and returning the conditioned air to the enclosure, a thermostatic instrument responsive jointly to the dry and wet bulb temperatures of the air outside the enclosure and to the dry and wet bulb temperatures of the air inside the enclosure, and operatable means connecting the thermostatic instrument with respective regulating devices of the air conditioning apparatus, whereby the effective temperature of the air within the enclosure, is maintained in predetermined relation to the effective temperature of the air outside the enclosure.

30. A control instrument for air conditioning systems comprising an outside effective temperature member, means responsive to psychrometric conditions of the outside air for moving said member in accordance with the effective temperature variations of the outside air, and means coacting with said member responsive to psychrometric conditions of the inside air adapted to automatically control the operation of an air conditioning system for maintaining the inside effective temperature at a predetermined relation to the outside effective temperature.

31. In combination with air conditioning apparatus for an enclosure, mechanism for controlling said apparatus comprising means responsive to psychrometric conditions of air, and a second means responsive to psychrometric conditions of air for modifying the operation of the first means, at least one of said means being responsive to effective temperature conditions.

32. An improved method of temperature and humidity control of air in an enclosure which comprises determining the relation which the psychrometric condition of the air inside the enclosure has to the effective temperature of the air outside the enclosure, varying the psychrometric condition of a volume of air in accordance with such relative condition, so that when said volume of air is mixed with the air in the enclosure, the effective temperature of said enclosed air will be maintained intermediate between a predetermined effective temperature and the effective temperature prevailing in the air outside the enclosure.

33. A control instrument for air conditioning systems comprising an outside effective temperature member, means connected with said member and actuated by the psychrometric condition of the outside air for moving said member in accordance with the effective temperature of the outside air, and means coacting with said member and actuated by the psychrometric condition of the inside air adapted to automatically control the operation of an air conditioning system for maintaining the inside effective temperature at a predetermined relation to the outside effective temperature.

34. In combination with air conditioning apparatus for an enclosure, mechanism for controlling said apparatus comprising means responsive to changes in the psychrometric conditions of air for maintaining a predetermined effective temperature, and a second condition responsive means for modifying the operation of said control mechanism.

ALBERT E. BEALS.